United States Patent [19]
Maxwell

[11] 3,862,410
[45] Jan. 21, 1975

[54] BICYCLE WARNING LIGHT
[75] Inventor: John H. Maxwell, Shawnee, Okla.
[73] Assignee: Maxetron Industries, Inc., Lawton, Okla.
[22] Filed: Oct. 25, 1973
[21] Appl. No.: 409,546

[52] U.S. Cl. .................. 240/7.55, 240/58, 240/90, 340/134
[51] Int. Cl. .............................. B62j 5/00
[58] Field of Search ........ 240/73 BJ, 7.55, 58, 10.6, 240/90, 10.65, 10.66; 340/84, 87, 119, 134

[56] References Cited
UNITED STATES PATENTS

| | | | |
|---|---|---|---|
| 2,324,614 | 7/1943 | Dalton | 240/8.1 A |
| 2,611,072 | 9/1952 | Potekin | 240/10.65 X |
| 2,788,763 | 4/1957 | Ries | 240/7.55 X |
| 2,887,563 | 5/1959 | Kiekhaefer | 340/87 X |
| 3,696,240 | 10/1972 | Potter | 240/90 X |
| 3,696,334 | 10/1972 | Demeter | 340/119 |
| 3,742,209 | 6/1973 | Williams | 240/73 BJ |

Primary Examiner—Samuel S. Matthews
Assistant Examiner—Alan Mathews
Attorney, Agent, or Firm—Robert K. Rhea

[57] ABSTRACT

A battery containing casing is secured to the outwardly projecting end portion of a bicycle rear wheel axle. A self-supporting coil spring is secured to the casing in upstanding relation. A mast is secured, at its depending end, to the upper end of the spring and supports lamp receiving socket means at its upper end with the lamp connected to the battery through a switch supported by the casing.

3 Claims, 4 Drawing Figures

Patented Jan. 21, 1975
3,862,410
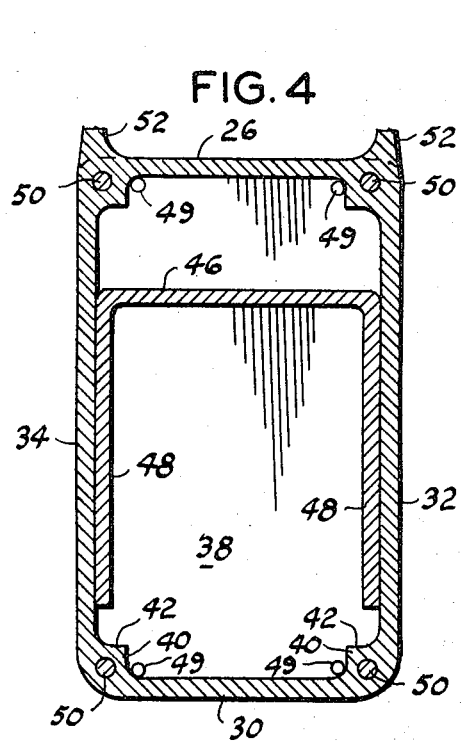
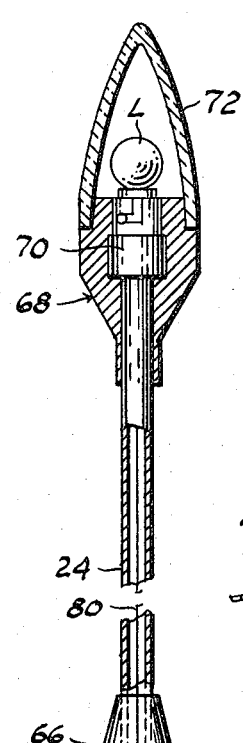
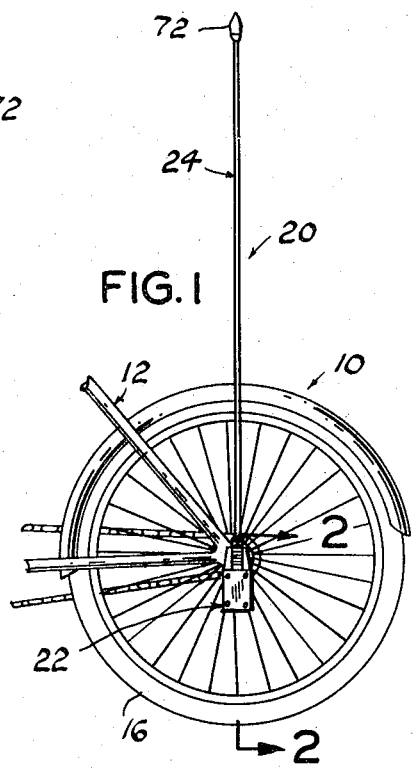
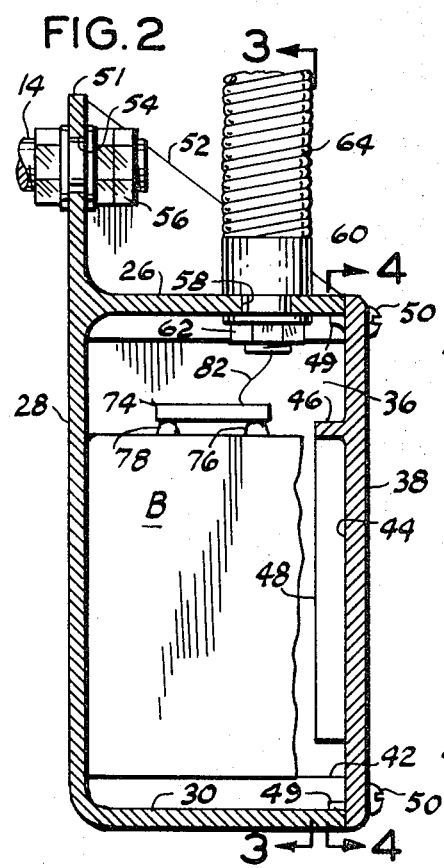
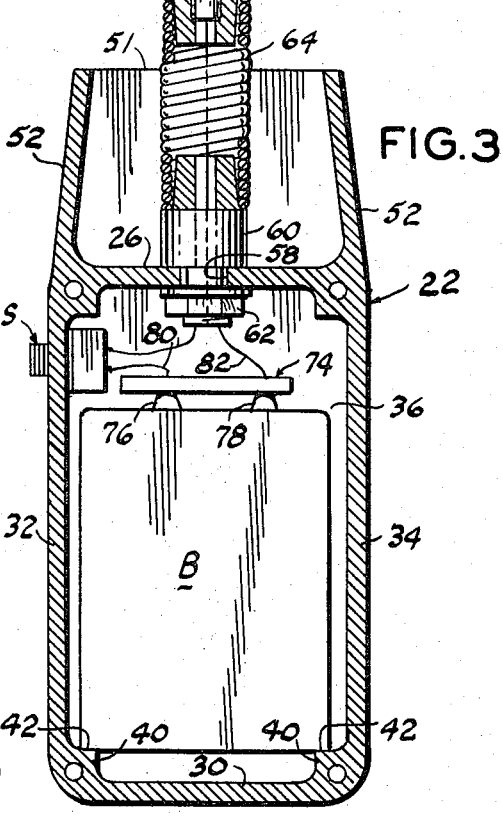

BICYCLE WARNING LIGHT

BACKGROUND OF THE INVENTION

1. Field of the Invention

The present invention relates to bicycles and more particularly to a moving warning light supported by the bicycle.

It is conventional to mount a tail light or red warning light on the rearward portion of a bicycle, however, these lights are ordinarily of relatively small diameter and are not readily seen by oncoming drivers overtaking the bicycle. It is well known that a light moving in a to and fro action is more likely to attract attention, particularly when the position of the light is elevated above the surface of the earth and is substantially near the line of sight of drivers.

This invention provides such a warning light for bicycles, and the like.

2. Description of the Prior Art

U.S. Pat. No. 2,887,563 discloses mounting a retractable self-supporting coil spring on an outboard motor and having a light attached to the upper end of the spring to serve as a stern light wherein the spring may be flexed when encountering an obstruction. U.S. Pat. No. 2,999,149 discloses mounting a light at the upwardly disposed end of a flag mast.

This invention is distinctive over these patents and conventional tail light lamps mounted on bicycles by connecting a light equipped mast to a casing mounted on a bicycle axle through a coil spring so that lateral, as well as forward movement, of the bicycle tends to generate a waving action of the upper end portion of the mast to provide a moving and flashing light as a warning for oncoming drivers of the presence of the cyclist.

SUMMARY OF THE INVENTION

A battery containing casing is secured to the outwardly projecting end portion of the bicycle rear wheel axle by an aperture in the casing wall. A self-supporting coil spring, mounted on the casing, is in turn connected with the depending end portion of an elongated mast having lamp receiving socket means secured to its upper end within a globe. An electrical circuit, including a switch mounted on the casing, connects the battery to the lamp.

The principal object of this invention is to provide a flashing warning light for a bicycle, or the like, and generating a to and fro waving action in response to movement of the bicycle when ridden by a cyclist.

BRIEF DESCRIPTION OF THE DRAWINGS

FIG. 1 is a side elevational view of a bicycle rear wheel supported by a fragment of the frame having the device secured to the rear wheel axle;

FIG. 2 is a fragmentary vertical cross-sectional view, to a larger scale, taken substantially along the line 2—2 of FIG. 1;

FIG. 3 is a vertical cross-sectional view, partially in elevation, taken substantially along the line 3—3 of FIG. 2 and including the upper end portion of the mast; and, FIG. 4 is a vertical cross-sectional view taken substantially along the line 4—4 of FIG. 2.

DESCRIPTION OF THE PREFERRED EMBODIMENT

Like characters of reference designate like parts in those figures of the drawings in which they occur.

In the drawings:

The reference numeral 10 indicates the rearward end portion of a bicycle including a frame 12 having an axle 14 (FIG. 2) extending through a support wheel 16. The numeral 20 indicates the device, as a whole, comprising a casing 22 and mast 24. The casing 22 is shown rectangular in general configuration including a top wall 26, a back wall 28, a bottom wall 30, all integrally joined to opposing side walls 32 and 34 to form a battery receiving chamber 36 which is opened and closed by a front wall or lid 38. At their depending limits, the side walls are provided with inwardly extending projections 40 forming a pair of shoulders or ledges 42 which support a substantially conventional battery B. The innersurface 44 of the lid 38 is provided with an inverted U-shaped lip 46 with the bight portion of the U-shaped lip overlying the adjacent marginal top edge of the battery B with the legs 48 of the U-shaped lip being interposed between opposing sides of the battery and innersurfaces of the side walls 32 and 34, respectively, thus supporting the battery against tilting movement within the chamber 36. The innersurface of the lid is also provided with a plurality of guide pins 49 engaging cooperating innersurfaces of the casing walls for properly positioning the lid 38 to receive screws 50 connecting the lid to the casing walls.

An upstanding flange, integral with the back wall 28, forms an upstanding wall 51 in the plane of the back wall braced by flange walls 52 projecting downwardly toward and secured to opposite edge limits of the top wall 26. An aperture 54, formed in the flange wall 51, receives the bicycle axle 14 and is secured thereon by nuts 56. The top wall 26 is provided with an aperture 58 which receives the depending end of a centrally bored mast base 60 secured therein by a nut 62.

A helically wound self-supporting spring member 64 is secured at its depending end portion with the mast base 60 and is secured at its upper end to the base portion 66 of the mast 24. The mast 24 is shown formed of constant diameter metallic tubing but obviously may be formed of other materials, such as fiberglass, or the like, and tapered toward its upper end, if desired. A mast head 68, coaxially surrounds and is secured to the upper end portion of the mast and is coaxially provided with socket means 70 which receives a flasher type lamp L. The length of the mast is preferably such that the lamp L is disposed in or above a horizontal plane defined by passenger automobile tops.

A globe 72 surrounds the lamp L and is secured in a conventional removable manner to the mast head 68.

A connector 74 overlies and contacts, in electrical conducting relation, the terminal posts 76 and 78 of the battery.

An "on-off" switch S, mounted within the casing and projecting through a suitable aperture in one of its walls, is connected in series between the battery B and lamp L by a wire 80 with the other wire 82 forming a ground wire for the electrical circuit. Obviously a conventional flasher, not shown, may be interposed in the circuit to achieve the lamp flashing action.

OPERATION

In operation the casing is secured to the axle 14, as illustrated in FIGS. 1 and 2, and the switch S moved to the "on" position thus exciting the lamp filament and generating an "off-on" flashing action. Movement of the bicycle by the cyclist, in addition to its forward motion, generates a slight vertical tilting action of the axle 14 about its horizontal axis tending to generate a lateral to and fro movement of the upper end portion of the mast in a waving action which is enhanced by the resistance of the spring in being deflected by the mass of the mast and returned toward the vertical axis of the mast base 60.

Obviously the invention is susceptible to changes or alterations without defeating its practicability, therefore, I do not wish to be confined to the preferred embodiment shown in the drawings and described herein.

I claim:

1. A warning light for a bicycle having an axle, comprising:
    a casing having top, bottom and side walls joined to
        a back wall for forming a chamber,
        a battery within said chamber,
        a front wall forming a lid for opening and closing the chamber,
        said lid having an innersurface with a lip thereon normally overlapping a marginal edge portion of said battery for preventing movement of said battery with respect to the innersurfaces of the casing walls forming the chamber,
        said back wall having an aperture for receiving one end portion of said axle;
    an upstanding generally cylindrical self-supporting coil spring secured at its depending end with said casing;
    an elongated mast coaxially secured at one end portion, to the other end portion of said coil spring; and,
    socket means, adapted to receive a lamp, secured to the other end portion of said mast,
        said coil spring being deflected by the mass of said mast and said socket means in response to movement of said bicycle for generating lateral movement of said mast with respect to its normally vertical axis.

2. The warning light according to claim 1 and further including:
    wiring means including an off-on switch connecting said battery with said lamp; and,
    a globe covering said lamp.

3. The warning light according to claim 2 in which said casing means further includes:
    a flange secured to said back wall and forming an extension thereof projecting beyond the plane of said top wall, said flange containing the axle receiving aperture.

* * * * *